United States Patent [19]
Swanson

[11] Patent Number: 5,990,912
[45] Date of Patent: Nov. 23, 1999

[54] VIRTUAL ADDRESS ACCESS TO TILED SURFACES

[75] Inventor: Roger W. Swanson, Santa Clara, Calif.

[73] Assignee: S3 Incorporated, Santa Clara, Calif.

[21] Appl. No.: 08/884,573

[22] Filed: Jun. 27, 1997

[51] Int. Cl.⁶ .................................................. G06F 12/06
[52] U.S. Cl. ......................................... 345/516; 345/509
[58] Field of Search .................................... 345/515, 516, 345/512, 507–509, 191; 711/200, 202, 203–207

[56] References Cited

U.S. PATENT DOCUMENTS

| | | | |
|---|---|---|---|
| 5,422,997 | 6/1995 | Nagashima | 345/516 |
| 5,721,885 | 2/1998 | Nishide | 345/525 |
| 5,745,739 | 4/1998 | Wang et al. | 345/516 |
| 5,828,382 | 10/1998 | Wilde | 345/501 |

*Primary Examiner*—Kee M. Tung

*Attorney, Agent, or Firm*—Fenwick & West LLP

[57] ABSTRACT

A data accessing system provides access data to video display stored in one or more frame buffers via a virtual frame buffer implemented as a phantom port. The virtual frame buffer facilitates remapping between pixel coordinate space and memory address space for both tiled and linear addressing schemes. Generation of virtual linear and virtual tiled addresses is obtained through one or more of shifting, replacing, and concatenating operations. These operations can be implemented to perform very fast in comparison to the multiplication, addition, division, and modulo operations used in conventional display processors, video controllers, and central processing units. In some embodiments of the virtual addresses are converted to addresses in a frame buffer for accessing the frame buffer. Alternate embodiments use a frame buffer adapted to respond directly to generated virtual addresses. The present invention can thus generate addresses for accessing data in a frame buffer and efficiently use data storage capacity in the frame buffer.

16 Claims, 11 Drawing Sheets

Linear Address to (X,Y)

X = Linear Address % Scan Length
Y = Linear Address / Scan Length

(X,Y) to Linear Address (X+(Y x scan length)) = Linear Address

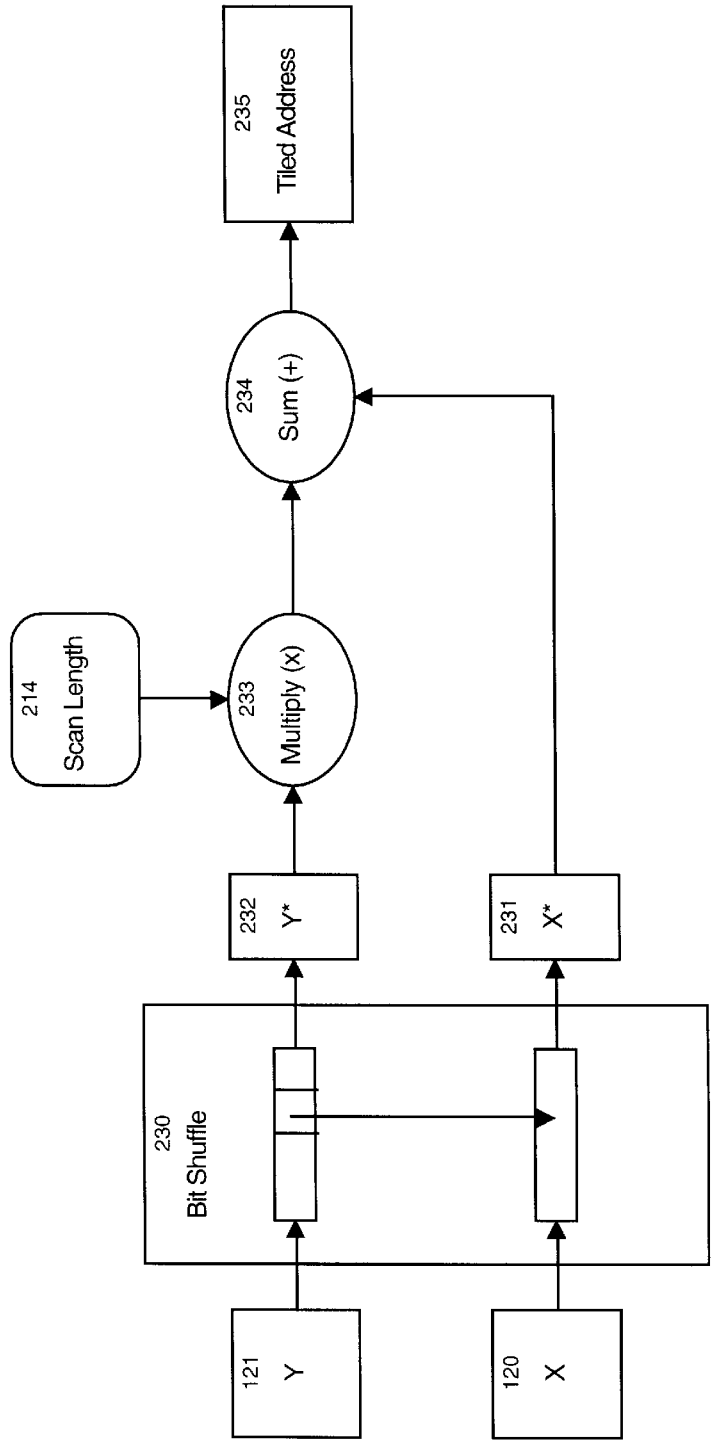

VIRTUAL ADDRESS ACCESS TO TILED SURFACES

BACKGROUND OF THE INVENTION

1. Field of the Invention

The present invention relates to methods and apparatuses for accessing data in a memory system, and more particularly, to a method and apparatus for rapidly accessing data in a frame buffer for generating video images on a display panel of a computer system.

Description of the Related Art

A current trend in hardware and software design is the development of computer systems and software applications for processing and displaying video images. Software for processing and displaying video images finds widespread application in user interfaces, plotting software, electronic publishing applications, computer-aided drafting and design programs, computer simulation, animation software, and the like. Many computer systems provide software support for generating, processing and displaying video images in the form of a graphics software package that provides video generation and processing routines available to both hardware, such as a central processing unit (CPU), and also other software applications, such as user interfaces. Such a graphics software package typically implements a recognized graphics specification, such as Direct3D from Microsoft, or OpenGL from Silicon Graphics, for improved portability of software applications into and out of the computer system.

For generating and processing video images, the hardware of a conventional computer system typically includes a central processing unit (CPU) for running software, a system memory for storing software and data for the CPU, one or more input devices such as a keyboard or a mouse, a display panel having a display surface containing an array of picture elements (pixels) with the intensity and color of each pixel being separately controllable for generating video images, a frame buffer for storing data that identifies the proper intensity and color to be provided by each pixel of the display surface (herein video data), a video controller for reading video data in the frame buffer and sending the video data to the display panel in an appropriate format for controlling the pixels, and a bus for carrying digital data such as the video data among various components of the computer system. Many conventional computer systems additionally include a display processor that supplements the CPU at generating and processing video images.

Many conventional computer systems use a cathode ray tube monitor (CRT monitor) similar to the picture tube of a conventional television set, as a display panel, and the video controller typically converts the video data from the digital format used by the CPU, system memory, frame buffer, bus, and input devices into an appropriate analog format for the CRT monitor, and then sends the analog data to the CRT monitor on a dedicated analog line.

The system memory of conventional computer systems typically comprises a plurality of memory cells. Each memory cell holds a word of data and has a distinct address. The address of a memory cell distinguishes the memory cell from other memory cells in the system memory, and is used for accessing the memory cell to read or write data in the memory cell. The addresses are typically numerical and form a sequence from a low address to a high address in the system memory. To read a word of data from the system memory, the system memory is provided a read request and the address for the memory cell storing the word. Similarly, to write a word of data in the system memory, the system memory is provided a write request, the address of the memory cell that will store the word, and the word of data.

The frame buffer is typically a data storage device similar to the system memory, and in some conventional computer systems, the frame buffer is merely a portion of the system memory. The frame buffer typically holds the video data as a pixel map (pixmap) that associates each pixel of the display panel with a distinct memory cell of the frame buffer that holds a word of video data identifying the intensity and color that the associated pixel should provide. The address of the memory cell storing the video data for a pixel can be determined by the location of the pixel on the display surface. The location of a pixel typically is identified by a horizontal X coordinate and a vertical Y coordinate of the pixel (herein (X, Y) coordinates) on the display surface. The data stored in the frame buffer is appropriately updated to change the image displayed on the display surface.

Because pixmaps can require a large volume of memory storage to implement, conventional computer systems typically store the words of a pixmap at consecutive addresses of the frame buffer to avoid wasting storage capacity in the frame buffer. These consecutive addresses are typically generated using addition and multiplication hardware in the CPU or a display processor when reading or writing video data in the frame buffer and also in the video controller when reading the frame buffer to obtain data to be sent to the display panel. The multiplication and addition operations are applied to the horizontal X coordinate and the vertical Y coordinate of the pixel to determine the address of the pixel. For example, to generate a linear addressing of the frame buffer, a conventional computer system typically multiplies the Y coordinate by the number of pixels in each horizontal line of pixels on the display surface and then adds to the product the X coordinate and a memory offset that determines the first address in the frame buffer. The time needed to perform multiplication and addition operations for generating addresses for video data can delay the generation of video images and the hinder the CPU in performing other operations by tying up the system memory.

Processing video images often requires access by the CPU or display processor to video data associated with localized regions of the display panel as opposed to access to data associated with an isolated pixel or pixels. For example, to generate a wide line for display, a CPU or display processor may need to write video data associated with numerous adjoining pixels of a display panel into the frame buffer. Similarly, filtering of video images may require a CPU or display processor to both read and write data associated with adjoining pixels of the display surface. For providing rapid access to such localized data, some conventional computer systems store pixmaps in a tiled pattern within a frame buffer, with the display surface identified as an array of rectangular tiles with each tile holding a rectangular array of pixels, and with the pixels of each tile stored in a continuous sequence of addresses of the frame buffer.

Unfortunately, conventional computer systems are typically limited in the extent to which they can advantageously implement tiling schemes. Generating tiled addresses often requires a CPU or display processor to perform arithmetic operations that can be more complicated than the multiplication and addition operations used in the linear addressing of the frame buffer described above. Further, a linearly addressed frame buffer is often preferable for conventional video controllers because conventional display panels such as CRT monitors are typically illuminated by scanning pixels on a display surface of the display panel on a horizontal scan line by horizontal scan line manner. However, implementing a tiling pattern with relatively square tiles having the same or approximately the same number of pixels on horizontal sides as vertical sides is often desirable for generating graphics primitives such as circles and lines of various widths. Balancing the desirability of relatively square tiles with these limitations of conventional CPUs, display processors and video controllers generally results in tiles that are 8 to 32 times as wide as they are high. Further, some software applications generate their own linear addresses for video data in the frame buffer without the support of a graphics package or display processor. Such linear addresses typically are invalid in conventional tiled frame buffers, and a CPU or display processor typically must intercept and correct the invalid linear addresses to properly match the particular tiling employed in the frame buffer. Often, this is implemented using a display processor to convert the linear address back into the corresponding (X,Y) coordinates of the pixel and then to generate the appropriate tiled address from the generated (X,Y) coordinates. Considerable time is needed to perform each of these sequential steps, thus reducing the speed and temporal smoothness of presentation of the associated video image.

Intercepting (X,Y) coordinates and converting them into tiled addresses poses additional technical problems. First, since the (X,Y) coordinates may be stored in scatter gather memory, there may be multiple address ranges, potentially requiring a large number of clocks or multi-clock delay to check memory addresses. Second, converting back to (X,Y) coordinates requires an integer divide by the span size with remainder, which can be time-consuming. Finally, applications may wish to access data directly, which may cause problems if the interception is not transparent to the application.

In general, conversion or remapping from linear addresses to tiled addresses and vice versa can impose significant computational load and diminish performance of the system. Remapping from tiled addresses to linear addresses involves a relatively expensive multiply operation, and remapping from linear to tiled involves an even more expensive divide operation.

There is thus a need for an improved data accessing system that can provide rapid access and updating of pixmaps and other video data stored in one or more frame buffers. Such a data accessing system should preferably provide access to a frame buffer in response to receiving linear addresses, tiled addresses, or (X,Y) pixel coordinates, and should avoid time-consuming arithmetic operations, such as multiply or divide for generating or converting addresses. Such a data accessing system should preferably be able to generate tiled addressing of the frame buffer or buffers from received addresses or (X,Y) pixel coordinates. Such a data accessing system should also store a pixmap without wasting storage capacity in the frame buffer. Preferably such a system should also support a standard graphics specification such as Direct3D or OpenGL for generating detailed and dynamic graphic images, and for allowing the use of graphics applications designed in conformance with the standard graphics specification.

SUMMARY OF THE INVENTION

The present invention provides a data accessing system for accessing video data in one or more frame buffers of a computer system. The present invention advantageously uses a virtual frame buffer for providing rapid addressing of video data. The virtual frame buffer comprises a range of digital addresses, with each pixel of a display surface of a display panel having at least one associated virtual address in the virtual frame buffer. A virtual address for a pixel can be rapidly generated by the present invention using shifting, replacing, or concatenation operations applied to received coordinates of a pixel without the need for the complicated and relatively slow arithmetic hardware employed by conventional computer systems for generating addresses. The present invention can access the frame buffer quickly using the virtual address for reading or writing video data in the associated memory cell of the frame buffer. Expensive multiply and divide operations are avoided in favor of concatenation, shifting, and simple field extraction.

One embodiment of the data accessing system of the present invention generates virtual addresses from the horizontal X and vertical Y coordinates of the pixels received from a CPU or peripheral device. The horizontal X and vertical Y coordinates of a pixel are each received as a word of digital data representing the respective coordinate in, for example, the unsigned binary number system. The data accessing system first generates a virtual address for the pixel by appropriately concatenating the bits of X with the bits of Y and then concatenates or replaces bits of the result with a memory offset bit or bits indicative of a low address of the frame buffer. The data accessing system then converts the virtual address into an address in the frame buffer (herein a frame buffer address) by looking up the frame buffer address in a look-up table at a location determined by the virtual address. This allows a conversion pattern between virtual addresses and frame buffer addresses to be stored for rapid access to video data in the frame buffer, and avoids a shortcoming of conventional computer systems that require large numbers of arithmetic operations to be performed in hardware for determining frame buffer addresses for the numerous pixels of the display surface of a display panel.

In a preferred embodiment, virtual addresses operate in the context of a phantom port which performs remapping among (X,Y) coordinates, linear addresses, and tiled addresses without expensive multiply or divide operations. A block of unused sequential addresses in memory space is allocated to define a phantom port. Since there is no real memory assigned to these addresses, the phantom port can be enlarged with no cost. In one embodiment, the phantom port is enlarged to have a span size equal to the next power of two greater than or equal to the actual span size of the surface represented by the (X,Y) coordinates. For example, a surface of 480×640 pixels is enlarged to 480×1024. By so expanding the phantom port, the virtual address space has a width that is a power of two, so that the remapping operations can be implemented using simple field extraction and bit shifting. For example, extraction of (X,Y) coordinates from linear addresses merely involves extracting fields from the linear address; the X-value is in the lowest significant bits, and the Y-value starts in the bit position representing the span size.

Since the phantom port has sequential addresses, the addresses can be intercepted by the hardware in the core logic chip set.

Since the virtual address space is larger than the real memory assigned to the surface represented by the (X,Y) coordinates, a subset of virtual addresses do not map to real addresses. In one embodiment, access to these addresses produces a page fault. In another embodiment, accesses are ignored, thus permitting applications to be less precise in clipping algorithms, which may improve speed of execution.

An alternative embodiment of a data accessing system of the present invention uses a frame buffer adapted to respond directly to generated virtual addresses for the pixels. This beneficially eliminates the cost of hardware used to implement the look-up table and beneficially increases performance speed by eliminating the conversion from virtual addresses to frame buffer addresses. Virtual addressing hardware and a frame buffer are preferably implemented on a single integrated circuit chip in this embodiment of the present invention to beneficially simplify interconnection of the virtual addressing hardware with the frame buffer and avoid time delay penalties encountered in integrated circuitry when going off-chip to perform an operation.

Various embodiments of the present invention are provided for additional functionality, including data accessing systems responsive to received linear addresses for pixels generated in a CPU or peripheral device as well as (X,Y) coordinates of the pixels. Such embodiments of the present invention avoid a time delay encountered in typical display processors while converting a linear address determined by software running in a CPU back into corresponding horizontal X and vertical Y coordinates of the pixel before generating the address in the frame buffer associated with the pixel. Such embodiments of the present invention provide a plurality of virtual addresses for each pixel useful for very rapid windowing and canvassing of data and for changing frames of moving video images very rapidly and smoothly. Various embodiments of the present invention provide tiled addressing of the frame buffer for reducing accesses times to data associated with local regions of pixels contiguously located on the display surface of the display panel and are ideal for use in generating graphic images, particularly because relatively square tiles having either the same or approximately the same number of pixels on horizontal and vertical sides can be achieved. The present invention can also be implemented to provide video controller functionality without the need for a separate video controller, thereby eliminating the need for multiplication and addition hardware found in conventional video controllers.

The present invention generates frame buffer addresses quickly while beneficially avoiding the arithmetic hardware used by conventional display processors, video controllers, and CPUs. The present invention is thus ideal for use where a complex or moving video image should change quickly and smoothly on a real-time basis in response to real-time user or sensor input, which, for example, is often the case with video games, scientific monitoring, traffic flow control monitoring, and the like.

BRIEF DESCRIPTION OF THE DRAWINGS

FIG. 2D is a diagram of a remapping operation from (X,Y) coordinates to tiled addresses.

DETAILED DESCRIPTION OF THE INVENTION

Figure 1:
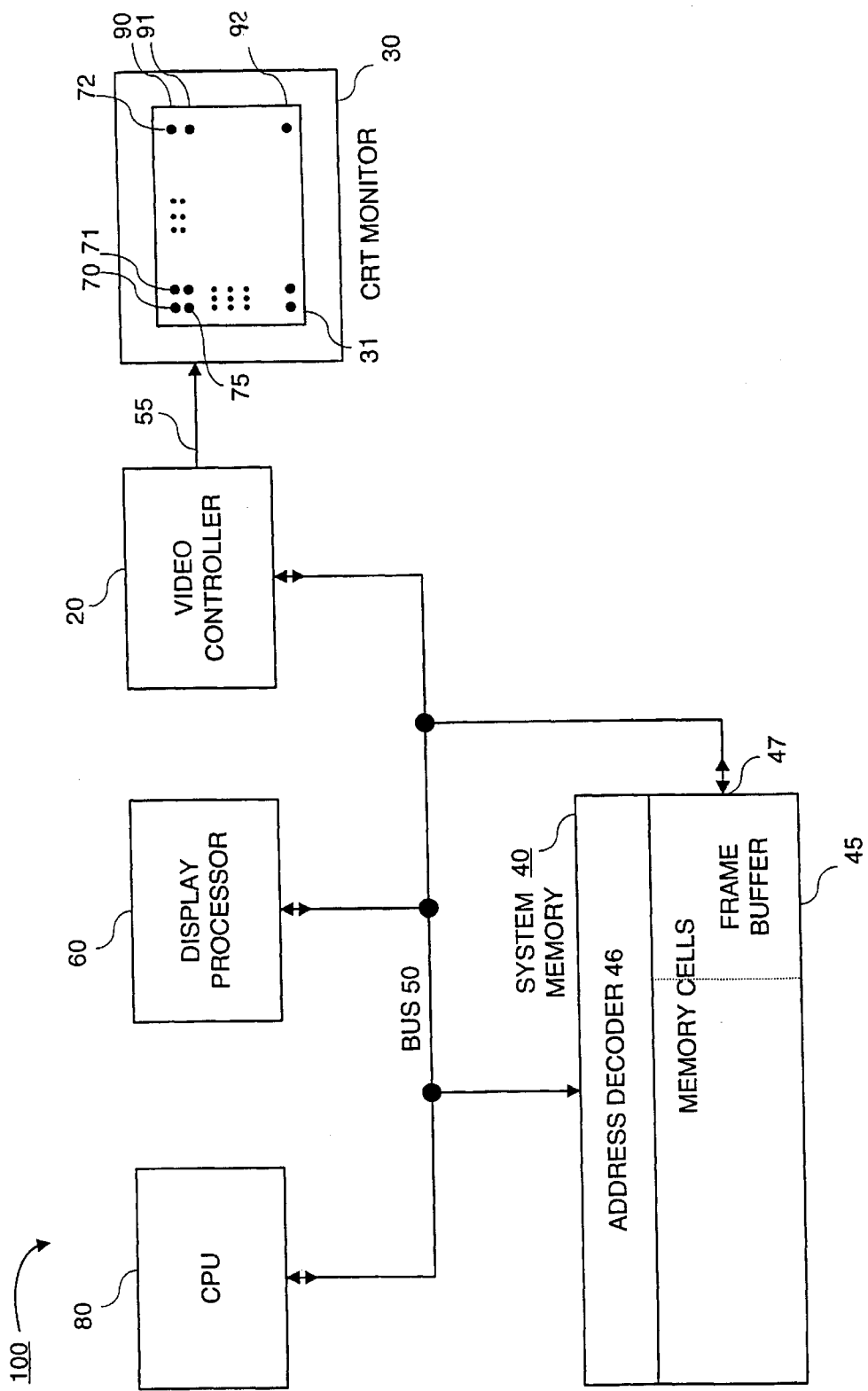
FIG. 1 is a block diagram of a computer system for providing video images according to the prior art.

Referring now to FIG. 1, there is shown a block diagram of a conventional computer system 100 capable of providing video images. The computer system comprises: a central processing unit (CPU) 80; a cathode-ray tube (CRT) monitor 30 having a display surface 31 for displaying video data; a system memory 40 having a plurality of memory cells for storing data with a portion of the memory cells comprising a frame buffer 45 for storing video data, an address decoder 46 for determining whether a read or a write is requested and if so for determining which memory cell to access and whether to read or write the memory cell, and a read/write port 47 for receiving data for and sending data from the memory cells including the memory cells in the frame buffer 45; a video controller 20 for reading video data stored in the frame buffer 45 and in response generating an analog signal for controlling illumination of an array of pixels on the display surface 31 of the CRT monitor 30; a display processor 60 for reading and writing video data in the frame buffer 45 including generating appropriate frame buffer addresses, a bus 50 that carries digital data for interfacing the CPU 80; display processor 60, video controller 20, and system memory 40 including the frame buffer 45; and a line 55 for carrying the analog signal generated by the video controller 20 to the CRT monitor 30 for controlling illumination of the pixels on the displaying surface 31.

The display surface 31 of the CRT monitor 30 comprises a rectangular array of picture elements (pixels) arranged in horizontal scan lines, with each scan line containing the same number of pixels. For each pixel of the display surface 31 there is associated a distinct memory cell of the frame buffer 45 for storing a word of video data that indicates an appropriate appearance to be provided by the pixel with which it is associated. The CRT monitor 30 illuminates the pixels on the display surface 31 by scanning a beam of electrons from left to right across each scan line, one scan line after another in succession from a top scan line 90 to a bottom a bottom scan line 92 of the display surface 31.

The video data stored in the frame buffer 45 is addressed linearly within the frame buffer 45, with a word of video data associated with a pixel 70 in the top left corner of the display surface 31 stored at a first memory address, a word of video data associated with a pixel 71 immediately to the right of the pixel 70 stored at the next memory address higher than the first memory address, and so on across a top scan line 90. A word of video data associated with a first pixel 75 at a left end of a second scan line 91 immediately below the top scan line 90 is stored at the next memory address higher than the memory address at which the word of video data associated with the last pixel 72 of the top scan line 90 is stored. The computer system 100 thus addresses the words of video data associated with the pixels of the display surface 31 onto a range of consecutive addresses without generating gaps between addresses associated with the pixels of the display surface 31. Such gaps could make efficient utilization of the storage capacity of the frame buffer 45 difficult. Further, the order of the addresses for the words of video data matches the order that associated pixels are scanned in the CRT monitor 30. For these reasons, conventional computer systems often address the video data for the pixels in this pattern or in some other scan line by scan line pattern without gaps in the addresses used.

While the video controller 20 can read the frame buffer 45 to obtain the video data that is used to generate the analog signal that controls illumination of the pixels, the video controller 20 does not typically generate the video data. Rather, the CPU 80 is typically used to generate a word of video data for each pixel of the display surface 31, and the word of video data is written to the frame buffer 45 so that the video controller 20 can read it. In some conventional computer systems, a display processor or other peripheral component can generate such video data. The word of video data in the frame buffer 45 associated with a pixel is updated to change the appearance of the pixel. The video controller 20 accesses the frame buffer 45 at the address associated with a pixel to read the word of video data associated with the pixel, with the word identifying an intensity and color that the pixel should provide.

To write a word of video data to the frame buffer 45, the CPU 80 can send the display processor 60 a write request for the display processor 60, the word of video data, and the horizontal X and vertical Y coordinates for the pixel associated with the word of video data. The display processor 60 then multiplies Y by $Span_x$, where $Span_x$ equals the number of pixels in each scan line of the display surface 31 of the CRT monitor 30 and is referred to herein as the horizontal span of the pixel coordinates. The display processor 60 then adds X and a memory offset to the result to generate the frame buffer address of the word of video data. The memory offset determines the address in the system memory 40 where the frame buffer 45 begins. The arithmetic operations are performed sequentially using multiplication and addition hardware within the display processor 60 similar to the integer arithmetic hardware found in CPU's, although the display processor 60 is omitted and the CPU 80 generates these addresses in some conventional computer systems. The display processor 60 then sends a write request for the system memory 40 and the appropriate address for the word of video data via the bus 50 to the address decoder 46 of the system memory 40. The address decoder 46 decodes the write request and address to access the associated memory cell in the frame buffer 45. The display processor 60 also sends the word of video data via the bus 50 to a read/write port 47 of the system memory 45, which is then written to the accessed memory cell in the frame buffer 45.

Typically, the CPU 80 can also read the frame buffer 45 in conventional computer systems. To read the frame buffer 45 for a word of video data associated with a pixel, a read request for the system memory 40 and the frame buffer address for the pixel is generated by the display processor 60 and sent via the bus 50 to the address decoder 46 of the system memory 40. Similarly, the video controller 20 generates a read request for the system memory 40 and an appropriate addresses in the frame buffer 45 to read the video data in the frame buffer 45 for generating the analog signal that controls illumination of the pixels. Both the display processor 60 and the video controller 20 use multiplication and addition hardware similar to the integer arithmetic hardware found in CPU's to generate these addresses.

The described linear addressing of video data has several drawbacks. The addition and particularly the multiplication performed by the display processor 60 and also by the video controller 20 can take considerable time to complete. The number of address calculations needed may be very large for a typical CRT monitor 30 having over 300,000 pixels. Further, the addition of the display processor 60 may increase traffic on the bus 50, which in turn could slow down the performance speed of the computer system 100 by preventing the CPU 80 from using the bus 50 for accessing other data.

Some conventional computer systems implement a tiled addressing of the frame buffer, with the pixels of the display surface 31 identified as an array of adjacent tiles and with each tile storing an equal sized rectangular array of pixels. Each of the tiles is treated for frame buffer access purposes as a small display surface, having a horizontal span $Span_{Xtiled}$ that divides the horizontal span $Span_x$ of the display surface 31 and a tile scan line consisting of pixels in the tile that are on the same scan line of the display surface 31. The scan processor linearly addresses the pixels of each tile to the frame buffer 45 on a tile scan line by tile scan line basis with $Span_{Xtiled}$ replacing $Span_x$ in the linear addressing. The tiles are addressed to consecutively addressed blocks of addresses of memory cells in the frame buffer 45 with a first tile in the upper left corner of the display surface 31 mapping to a first range of addresses of memory cells in the frame buffer 45 and the next tile to the right mapping to an adjacent next range of addresses of memory cells in the frame buffer 45, and so on across the top row of tiles, and then so on across any remaining rows of tiles.

While tiled addressing improves access to localized regions of video data, it does not typically simplify addressing of pixels. Consider an implementation of the described tiling pattern for tiles of size 128 pixels horizontally by four pixels vertically. The described tiling can be implemented in three steps as follows:

(1) generate a tiled horizontal coordinate for the pixel $X_{tiled}$=X[MSB:7]~Y[1:0]~X[6:0] by shifting and replacing the designated bits of X and Y;

(2) generate a tiled vertical coordinate for the pixel $Y_{tiled}$=Y[MSB:2] by removing the least two significant bits of Y; and (3) generate a tiled frame buffer address for X and Y as $add_{tiled}(X,Y)=(Y_{tiled}*(Span_x/Span_{Xtiled}))$;

where Y[1:0] refers to the least two significant bits in the standard unsigned binary representations of Y, X[6:0] refers to the least seven significant bits in the standard unsigned binary representation of X, Y[MSB:2] refers to the standard unsigned binary representations of Y with the two least significant bits removed, X[MSB:7] refers to the standard unsigned binary representation of X with the seven least significant bits removed, the concatenation "~" operation refers to concatenating the bits together in the order so that 01~10 becomes 0110, and $Span_{Xtiled}$ is the horizontal span of 128 of each tile. Generation of a bit representation of $add_{tiled}(X,Y)$ typically involves multiplying $Y_{tiled}$ by ($Span_x$/$Span_{Xtiled}$) followed by adding $X_{tiled}$ to the product, with each of these operations performed in arithmetic hardware such as a central processing unit (not shown). These operations, particularly the divide operation, can be time-consuming. Step 3 is similar to the generation of a linear address; however as the typical tiled addressing also requires steps 1 and 2 to be performed before step 3, tiling typically uses more hardware and can be computationally more time intensive than linear addressing.

Figure 2:
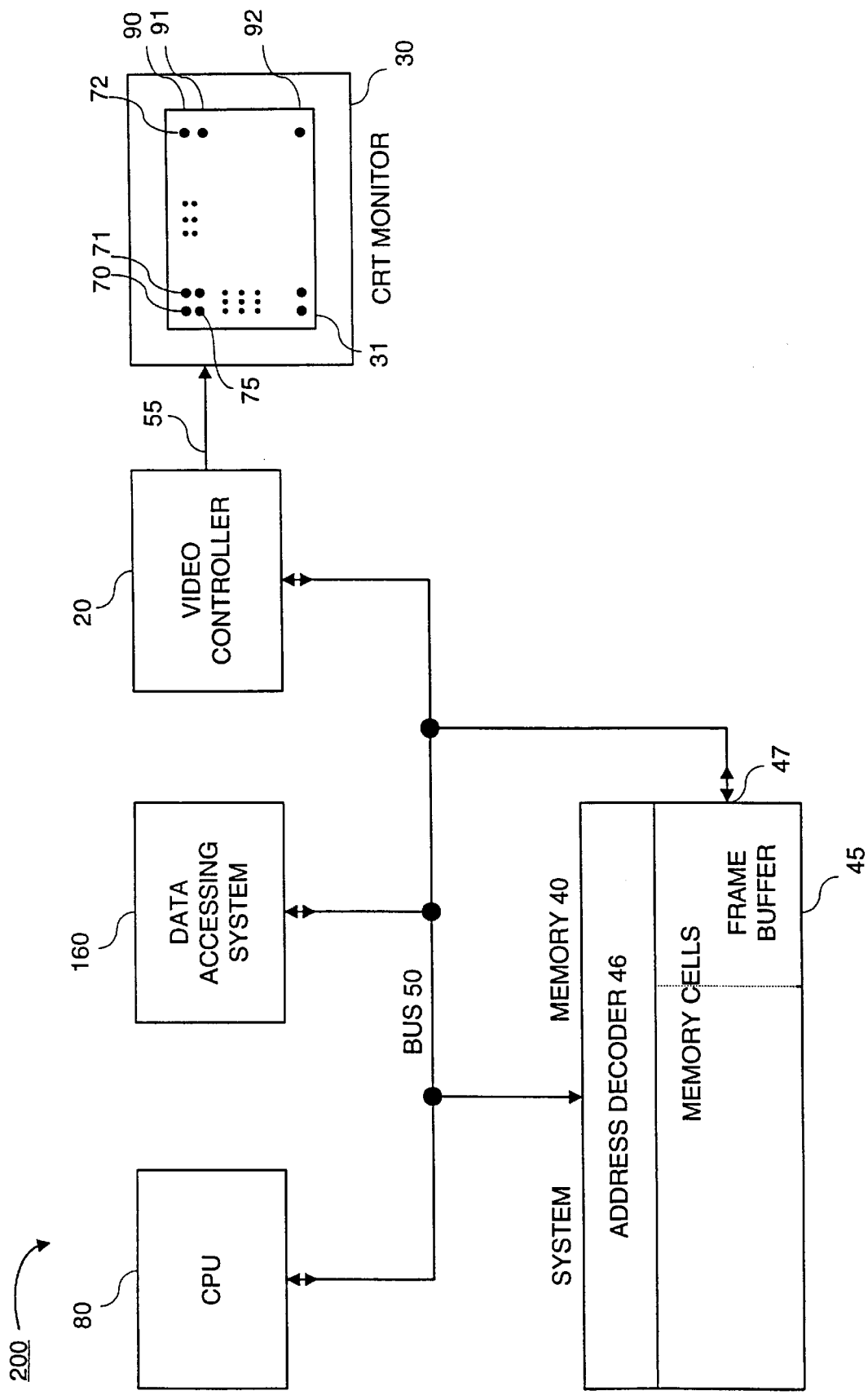
FIG. 2 is a block diagram of a computer system incorporating a data accessing system according to the present invention.

Referring now to FIG. 2, there is shown a computer system 200 incorporating one embodiment of a data accessing system 160 of the present invention. The computer system 200 includes: the CRT monitor 30; the CPU 80; the system memory 40 containing a frame buffer 45, address decoder 46, and read/write port 47; the bus 50; and the analog line 55 of the conventional computer system 100 of FIG. 1. However, the display processor 60 is replaced by the data accessing system 160.

Figure 2A:
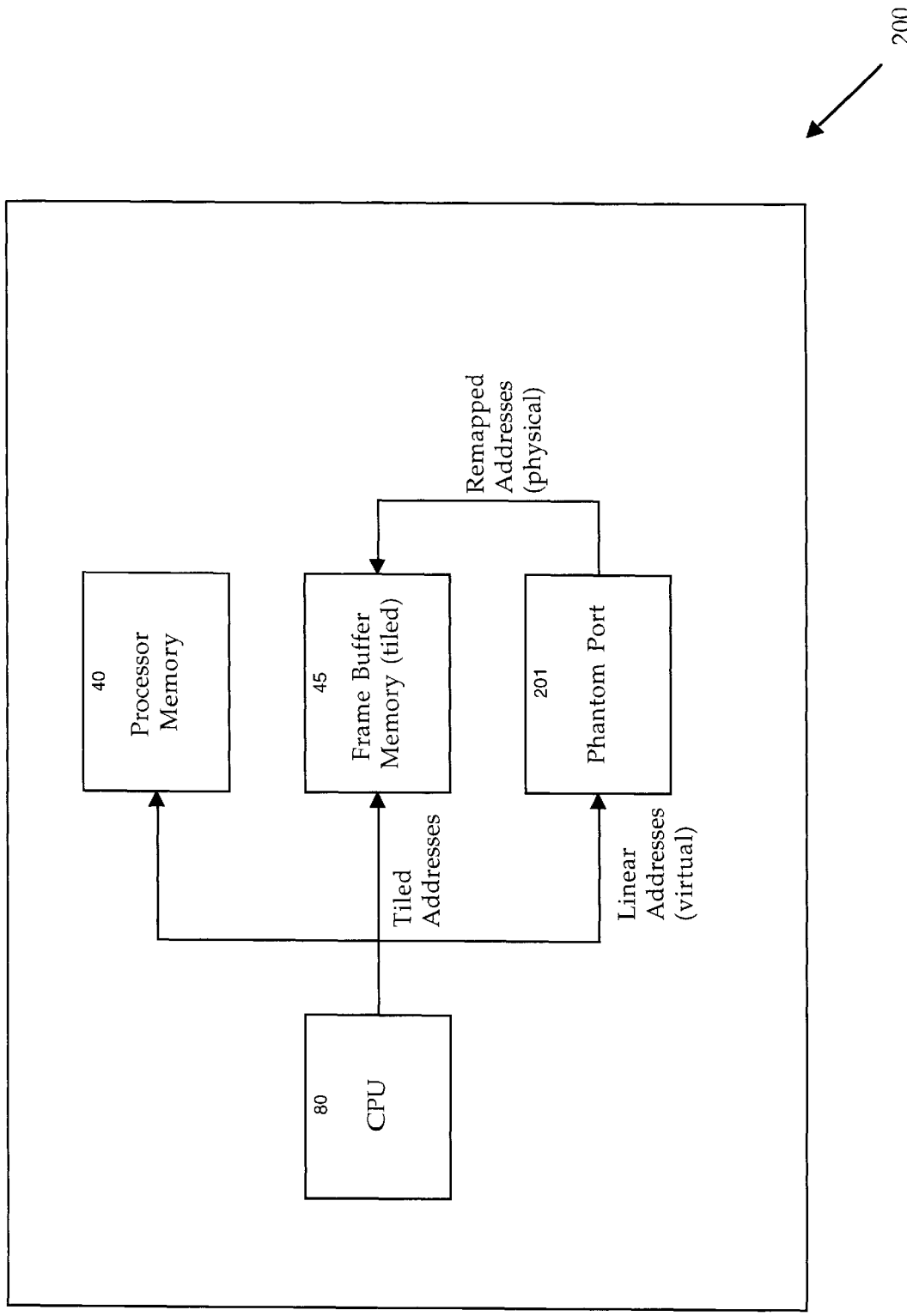
FIG. 2A is a block diagram of a conceptual model of the present invention.

Referring also to FIG. 2A, there is shown a conceptual block diagram of the operational elements of system 200. CPU 80 interacts with processor memory 40 and generates addresses for accessing memory locations in frame buffer memory 45. Frame buffer memory 45 is stored in a tiled format to provide the advantages discussed above. However, generation of tiled addresses by CPU 80 can be difficult and expensive due to the complex mathematical operations involved. Thus, the present invention provides phantom port 201 which accepts conventional linear addresses from CPU 80 and remaps them into tiled addresses for accessing frame buffer memory 45. The linear addresses are known as "virtual" addresses, and the remapped tiled addresses are known as "physical" addresses. In this manner, CPU 80 can generate linear addresses in a conventional (fast) manner, and access to tiled frame buffer memory 45 can proceed without computationally expensive mathematical operations.

The computationally intensive multiply and divide operations are avoided in one embodiment by enlarging phantom port 201 in the x-direction to the next power of two. This permits multiplication to be performed by bit-shifting, and division by simple field extraction from the bit string representing the address. Thus, remapping in both directions can be achieved with computationally inexpensive bitwise operations.

In one embodiment, frame buffer 45 is replaced by system memory, so that the phantom port addressing scheme may be applied to the entire system memory.

Figure 2B:
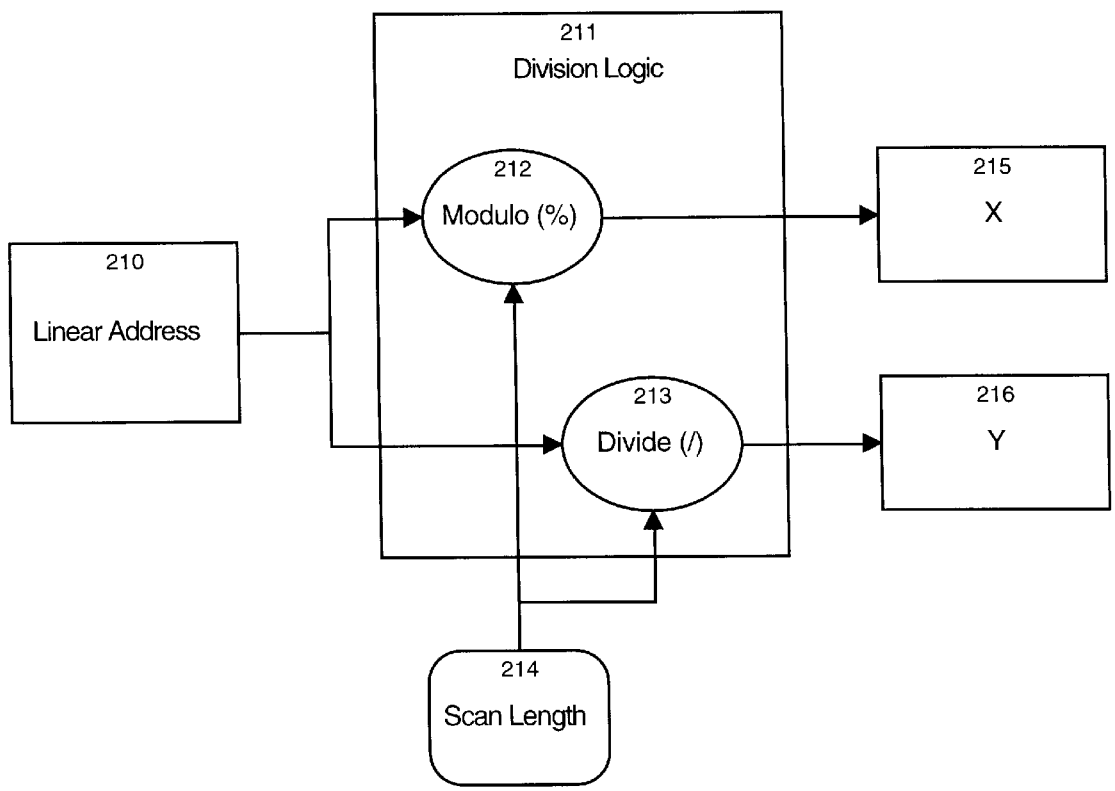
FIG. 2B is a diagram of a remapping operation from linear addresses to (X,Y) coordinates.

Referring now to FIG. 2B, there is shown a remapping operation for converting a linear address to (X,Y) coordinates. Division logic 211 is applied to linear address 210. Linear address 210 is divided 213 by scan length 214 to generate the Y-value 216. Modulo operation 212 is applied to linear address 210 and scan length 214 to generate the X-value 215 (the remainder of a division operation).

As will be described in more detail below, a phantom port with a span equal to a power of two allows extraction of (X,Y) coordinates in a simpler manner by field extraction. Modulo operation 212 reduces to merely extracting the N least significant bits of linear address 210, where N represents $\log_2$ (scan length), and divide operation 213 reduces to merely extracting bits beginning at position N.

Figure 2C:
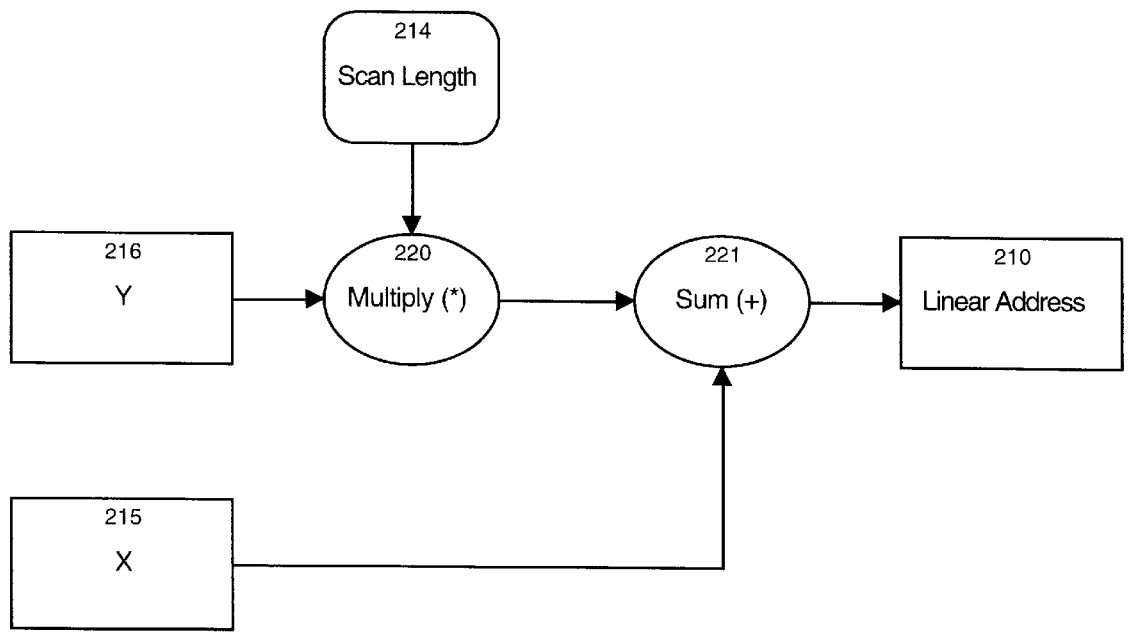
FIG. 2C is a diagram of a remapping operation from (X,Y) coordinates to linear addresses.

Referring now to FIG. 2C, there is shown a remapping operation for converting (X,Y) coordinates to a linear address. Y-coordinate 216 is multiplied 220 by scan length 214 and added 221 to X-coordinate 215 to generate linear address 210. Again, a phantom port with a span equal to a power of two reduces the multiply 220 to a bit-shifting operation and the sum 221 to a concatenation, thus simplifying the remapping operation.

Referring now to FIG. 2D, there is shown a remapping operation for converting (X,Y) coordinates to a tiled address. Bit shuffle 230 is performed on (X,Y) coordinates 215,216 to generate (X',Y') coordinates 231,232. Bit shuffle 230 is performed by reordering segments of the (X,Y) coordinates to generate a representation aligned on a tile-by-tile basis, with (0,0) being the origin point for the tile containing the coordinates. Y'-coordinate 232 is multiplied 233 by scan length 214 and added 234 to X'-coordinate 231 to generate tiled address 235. As above, a phantom port with a span equal to a power of two reduces the multiply 233 to a bit-shifting operation and the sum 234 to a concatenation, thus simplifying the remapping operation.

For more particularly describing the structure and functionality of this embodiment of the present invention, additional detail on the structure of the CRT monitor 30 and the system memory 40 is provided; however, the present invention can be used with frame buffers and display panels having different configurations than those herein described. The display surface 31 of the CRT monitor 30 may comprise, for example, an array of 307,200 pixels arranged in 480 horizontal scan lines, with each horizontal scan line of the array containing 640 pixels, with each pixel of the display panel identified by a unique pair (X,Y) of pixel coordinates, with X representing the horizontal coordinate and Y representing the vertical coordinate, and with the pixel in the upper left hand corner of the display surface 31 having coordinates (0,0). The X coordinate of a pixel equals the number of pixels in the display panel to the left of the pixel, and the Y coordinate equals the number of pixels in the display panel above the pixel. The system memory 40 may comprise, for example, a Dynamic Random Access Memory Unit (DRAM) having 32-bit memory cells addressed with 32-bit addresses, with the frame buffer 45 portion comprising a block of 307,200 of the memory cells addressed by a range of 307,200 sequential 32-bit addresses, with the memory offset that identifies the beginning address of the frame buffer 45 having the form memory offset= OFFSET~00 . . . 00 where OFFSET is a 4-bit sequence and the 00 . . . 00 is a 28-bit sequence of zero bits, and with each pixel of the display surface 31 associated with a distinct one of the memory cells that stores video data identifying how the pixel should appear on the display surface 31.

The data accessing system 160 can read and write video data in the frame buffer 45 by converting (X,Y) coordinates of a pixel to the associated address add(X,Y) of the pixel and then accessing the frame buffer 45 at the associated address add(X,Y) to perform a read or write operation. To generate addresses for reading and writing the frame buffer 45, the data accessing system 160 uses a virtual frame buffer comprising a range of digital addresses. For example, a range of 491,520 sequential addresses can be used as a virtual frame buffer having a height of 480 and a width of 1024. The width of 1024 is selected as a power of two at least large as the horizontal span of 640 of the pixel coordinates. As described above, the selection of a power of two facilitates conversion using bit-shifting and field extraction rather than more generalized multiply and divide operations. The virtual frame buffer supplies a distinct address for each pixel of the display panel (herein a virtual address), but unlike the frame buffer 45, is not used for storing video data. The width of the virtual frame buffer serves as a virtual span virtspan$_X$ of the horizontal coordinates of the display surface 31, and the height of the virtual frame buffer serves as a virtual span virtspan$_Y$ of the vertical coordinates of the display surface 31.

To write a word of video data in the frame buffer 45, a write request for the data accessing system 160 is sent via the bus 50 to the data accessing system 160 along with the horizontal and vertical (X,Y) coordinates of the pixel associated with the word of video data and the word of video data. The data accessing system 160 converts the pair (X,Y) of pixel coordinates into an associated virtual address virtadd(X,Y) in the virtual frame buffer and then converts the virtual address virtadd(X,Y) into the associated address add(X,Y) in the frame buffer 45 for the pixel. To write the word of video data to the frame buffer 45, the data accessing system 160 sends a write request for the system memory 40 and the frame buffer address add(X,Y) via the bus 50 to the address decoder 46 of the system memory 40 and sends the word of video data via the bus 50 to the read/write port 47 of the system memory 40.

To read the frame buffer 45, the data accessing system 160 is sent a read request for the data accessing system 160 via the bus 50 along with the (X,Y) pixel coordinates of the pixel associated with the word of video data to be read. The data accessing system 160 generates an associated virtual address virtadd(X,Y) for the pixel and converts the generated virtual address into the associated frame buffer address add(X,Y) for the pixel. The data accessing system 160 then sends a read request for the system memory 40 and the generated frame buffer address add(X,Y) to the address decoder 46 of the system memory 40 for accessing the memory cell of the frame buffer 45 associated with the pixel having coordinates (X,Y). This causes the system memory 40 to output the word of video data via the read/write port 47 of the system memory 40 onto the bus 50.

Figure 3:
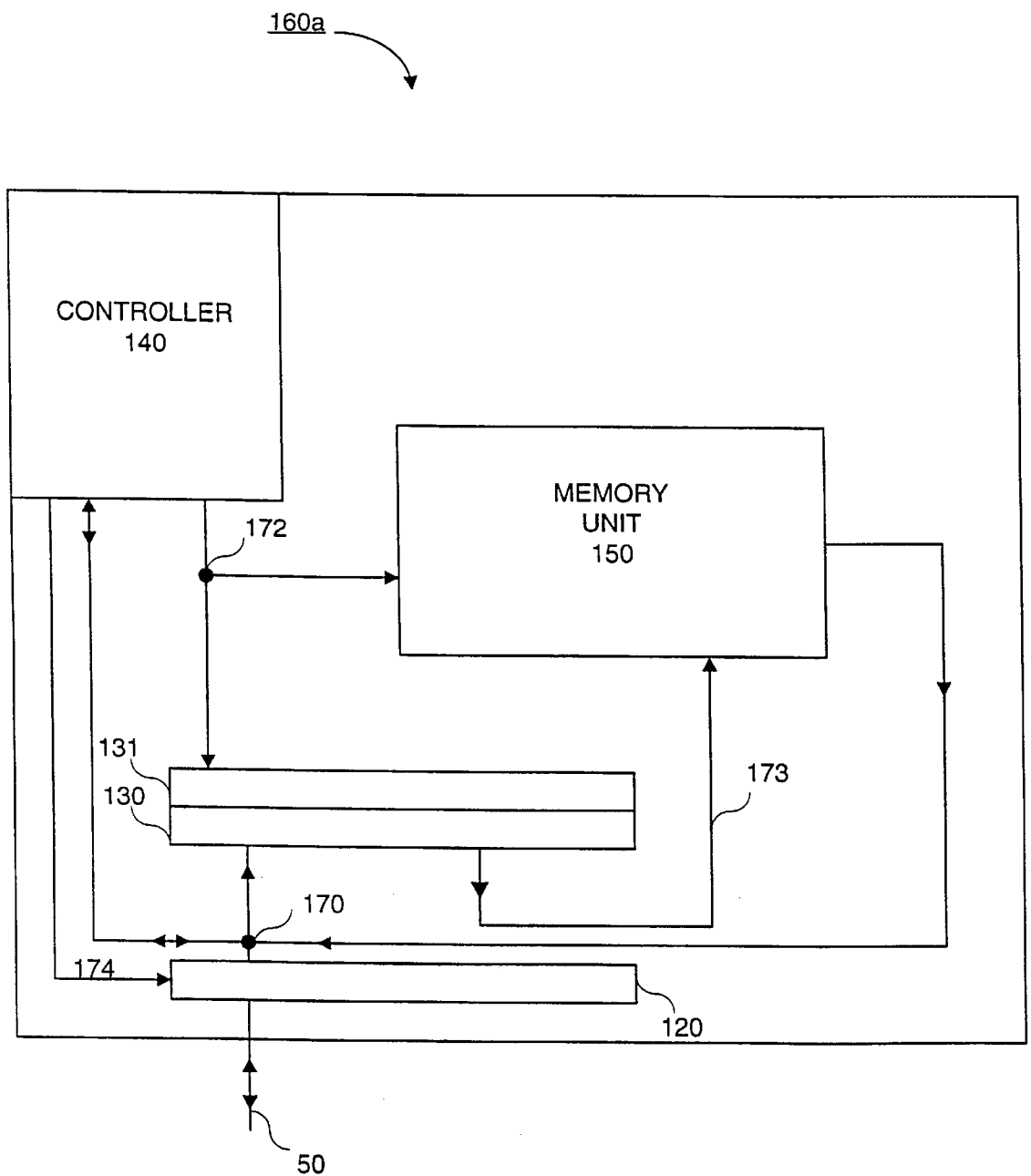
FIG. 3 is a block diagram of a data accessing system according to one embodiment of the present invention using linear addressing.
Figure 6:
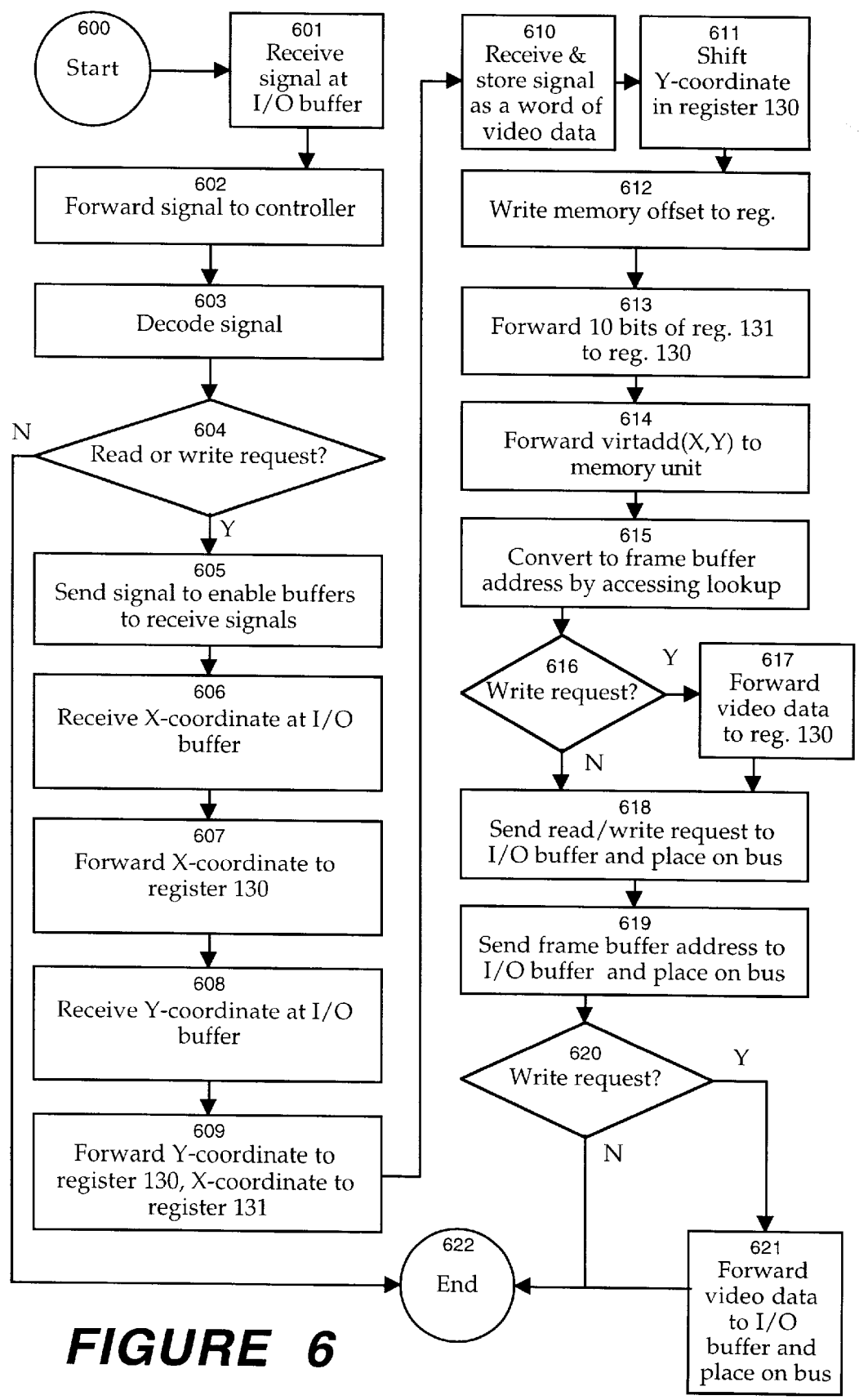
FIG. 6 is a flowchart of a method of generating a desired frame buffer access for linear addressing according to the present invention.

Referring now to FIG. 3 there is shown a block diagram of one implementation of the data accessing system 160*a* providing linear addressing of pixels on the display surface 31 of the display panel 30. The data accessing system comprises: a 32 bit input/output buffer 120, first and second 32 bit registers 130, 131, a memory unit 150 storing the conversion pattern between virtual addresses and frame buffer addresses, a controller 140, and lines 170, 172, 173, 174. In response to receiving a request to read or write a word of data associated with a pixel, the (X,Y) coordinates of the pixel, and the word of video data to be written if a write is requested, the data accessing system 160*a* generates the desired frame buffer access. Referring now also to FIG. 6, there is shown a flowchart of a method for accessing the frame buffer 45.

The input/output buffer 120 receives 601 via the bus 50 a signal and forwards 602 the signal via line 170 to the controller 140. The controller 140 decodes 603 the signal to determine 604 if the signal is a read request or write request for the data accessing system 160*a*; if the signal is either a read request or write request for the data accessing system 160*a*, then the controller 140 sends 605 a signal via control line 172 to the buffers 130, 131 that enables the buffers 130, 131 to receive signals. The input/output buffer 120 receives 606 via the bus 50 the X coordinate and forwards 607 the X coordinate via line 170 to the register 130. The input/output buffer 120 then receives 608 via the bus 50 the Y coordinate and forwards 609 the Y coordinate via line 170 to the register 130 while the register 130 forwards the X coordinate into the register 131. The controller 140 then sends a control signal via line 174 to the input/output buffer 120 that allows the input/output buffer 120 to receive and store 610 a signal on the bus 50 as a word of video data associated with the pixel having coordinates (X,Y).

The controller 140 sends a control signal via control line 172 to the register 130 causing the register 130 to shift 611 the Y coordinate to the left by $\log_2(\text{virtspan}_X)=10$ bits, zero filling the bits on the right that are vacated in the shift, and then replace 612 the 4 left most bits in register 130 with the OFFSET. The controller 140 sends a control signal via control line 172 to the register 131 causing the 10 right most bits in register 131 to be forwarded 613 into the ten right most bits of register 130 to replace the zero filled bits therein. The contents of register 130 represent the virtual address virtadd(X,Y) for the pixel having coordinates (X,Y). The controller 140 then sends a control signal via control line 172 to register 130 causing register 130 to forward 614 the virtual address virtadd(X,Y) via line 173 to the memory unit 150. The control signal on line 172 also causes the memory unit 150 to access 615 a look-up table stored therein containing a conversion pattern between virtual addresses and addresses in the frame buffer 45. In 616, if the request is a write request, the controller 140 also sends a control signal via line 174 to the input/output buffer 120 causing the input/output buffer 120 to forward 617 the word of video data stored in the input/output buffer 120 to register 130.

The controller 140 sends 618 a read or write request for the system memory via line 170 to the input/output buffer 120 and a control signal via line 174 to the input/output buffer 120 causing the input/output buffer 120 to send the read or write request for the system memory 40 via the bus 50 to the address decoder 46 of the system memory 40. The memory unit 150 then sends 619 the frame buffer address for the pixel at (X,Y) via line 170 to the input/output buffer 120 and the controller 140 sends a control signal via line 174 to the input/output buffer 120 causing the input/output buffer 120 to send the frame buffer address via the bus 50 to the address decoder 46 of the system memory 40. If the request sent to the data accessing system 160*a* was a write request, in 620 the controller 140 sends a control signal via line 172 to the register 130 to forward 621 the word of video data to the input/output buffer 120 and a control signal via line 174 to the input/output buffer 120 causing the input/output buffer to send the word of video data via bus 50 to the read/write port 47 of the system memory 40. Thus a read/write request for the system memory 40, the frame buffer address for the pixel having pixel coordinates (X,Y), and a word to be written to the frame buffer 45 if the data accessing system 160*a* was requested to write the frame buffer 45 are sent to the system memory 40 in an appropriate manner for reading or writing the frame buffer 45.

If the X and Y coordinates are treated as unsigned binary bit numbers, then the virtual address generated by the data accessing system 160*a* can be interpreted as being logically equivalent to forming:

$$X+(\text{virtspan}_X*Y[17:0])+(2^{28}*\text{OFFSET}). \quad \text{(Eq. 1)}$$

However, unlike conventional display processors, the data accessing system 160*s* does not require multiplication hardware such as the integer arithmetic hardware of a CPU to determine the terms:

$$(\text{virtspan}_X*Y) \text{ and } (2^{28}*\text{OFFSET}). \quad \text{(Eq. 2)}$$

Similarly, the data accessing system 160*a* does not require addition hardware such as an arithmetic logic unit (ALU) to combine such terms to form the virtual address virtadd(X, Y). These shifting and replacing operations can be implemented to perform faster than integer multiplication and addition operations implemented, for example, with an ALU fabricated using the same silicon process. The data accessing system 160*a* can be implemented to perform several of the steps in parallel, providing an additional increase in performance speed.

While the illustrated data accessing system 160*a* uses shifting and replacement of bits, an alternate embodiment of the present invention generates virtual addresses by concatenating bits of the X coordinate to bits of the Y coordinate, for example, by receiving the X and Y coordinates in separate registers, and concatenating OFFSET, Y[17:0], and X[9:0] to form a virtual address virtadd=OFFSET~Y[17:0]

~X[9:0]. Such alternate embodiments of the present invention can address data very quickly because no actual shifting of data bits is needed to determine an appropriate virtual address.

The data accessing system 160a converts the virtual address virtadd(X,Y) for the pixel at coordinates (X,Y) into the associated frame buffer address add(X,Y) for the pixel by accessing the memory unit 150, which holds the conversion pattern from the virtual addresses to the frame buffer addresses. The conversion pattern is stored and reused as needed, avoiding the dynamically performed addition and multiplication encountered in conventional CPU's and display processors.

An alternative embodiment of the present invention avoids the use of lookup tables for storing a conversion pattern between the virtual addresses and the frame buffer addresses by employing a frame buffer designed to respond appropriately to the virtual addresses. To reduce the number of memory cells needed for the frame buffer, the frame buffer can be designed not to have any cells for addresses in the virtual frame buffer that are not virtual addresses; i.e. that do not correspond to a possible pair of pixel coordinates. By avoiding the conversion between virtual addresses and frame buffer addresses, an additional increase in performance speed is achieved. This alternate embodiment of the present invention is preferably implemented using a frame buffer on board a single graphics chip also containing the data accessing system for simplifying interconnection of the frame buffer and the data accessing system. Using a single chip implementation also provides an additional increase in performance speed by avoiding the need for the data accessing system to go off-board to read or write the frame buffer.

Figure 4:
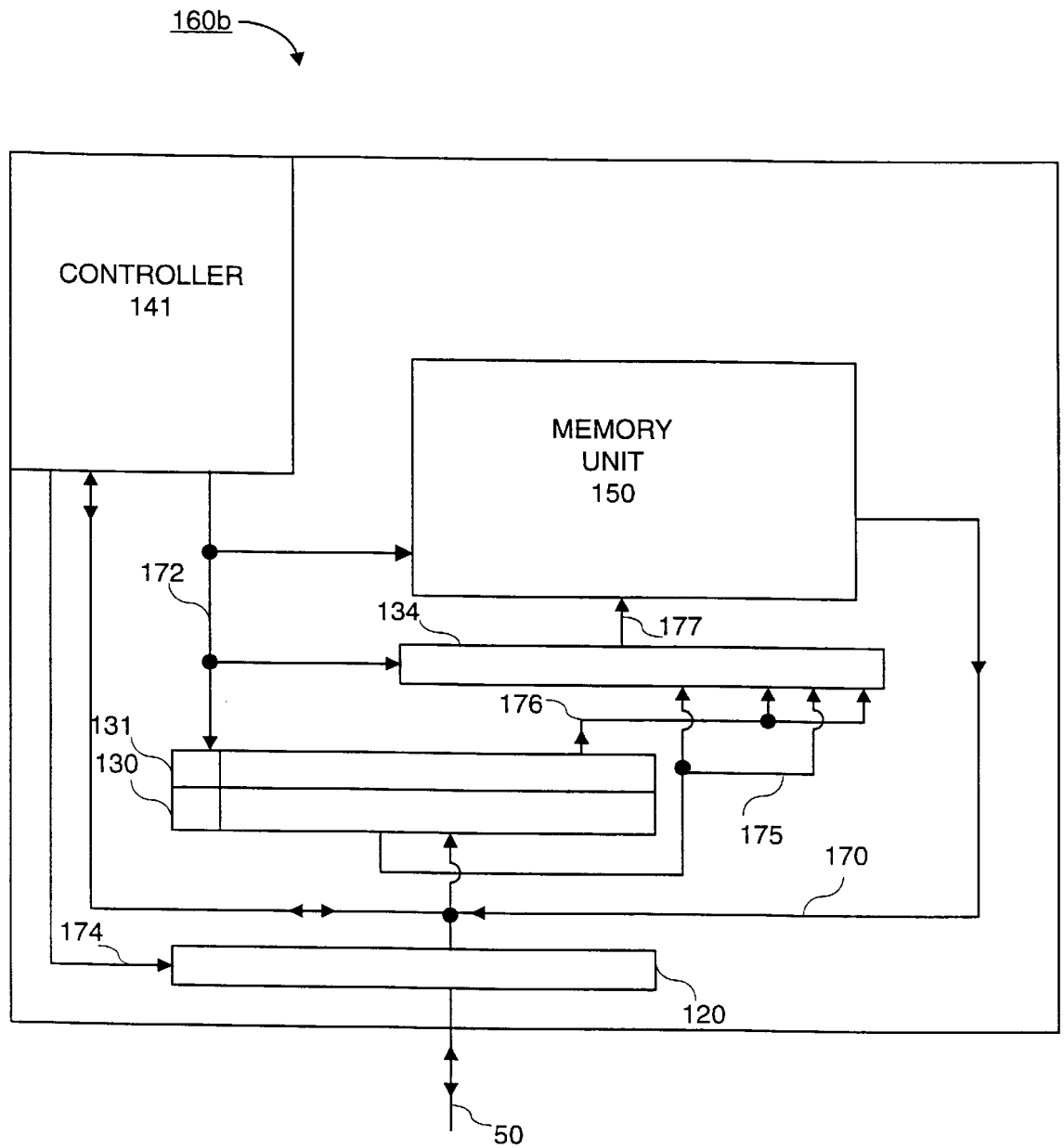
FIG. 4 is a block diagram of a data accessing system according to one embodiment of the present invention using tiled addressing.
Figure 7:
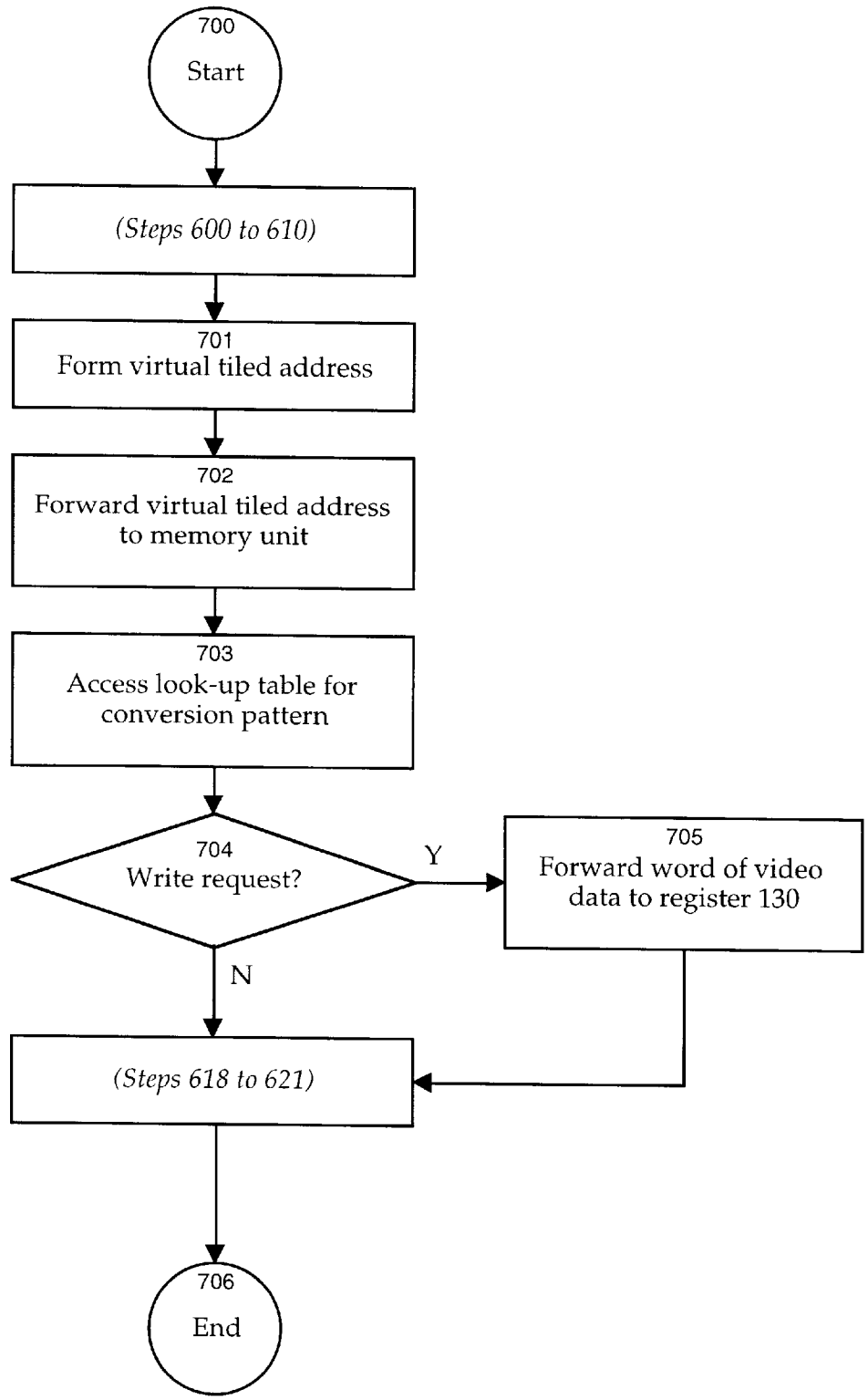
FIG. 7 is a flowchart of a method of generating a desired frame buffer access for tiled addressing according to the present invention.

Referring now to FIG. 4, there is shown an embodiment of a data accessing system 160b of the present invention incorporated for tiled addressing of the frame buffer 45. The data accessing system includes: the 32 bit input/output buffer 120, the first and second 32 bit registers 130, 131 respectively, the memory unit 150, and the lines 170, 172, 174 of the data accessing system 160 of FIG. 3. However, the data accessing system 160b additionally includes a third 32 bit register 134, a controller 141 designed for providing tiled addressing of the frame buffer 45, and lines 175, 176, 177. The data accessing system 160b uses square tiles having four pixels on each side though other shapes and sizes may also be used. Referring now also to FIG. 7, there is shown a method of generating frame buffer accesses with tiled addressing.

To perform a read or write operation to the frame buffer 45, the data accessing system 160b first performs steps 600 to 610 of FIG. 6. The controller 141 then sends a control signal via line 172 to the register 130 to replace the four leftmost bits of register 130 with the OFFSET and then a control signal to the registers 130, 131 to forward the bits for the OFFSET, Y[17:2], X[9:2], Y[1:0], and X[1:0] via lines 175, 176 for parallel input into the bits R[31:28], R[27:12], R[11:4], R[3:2], and R[1:0] respectively of register 134 to form 701 a virtual tiled address virtadd(X,Y) for the word of video data associated with the pixel at coordinates (X,Y) where R[n:m] represents the mth through nth bits of the register 134, and where virtadd(X,Y)=OFFSET~Y[17:2]~X[9:2]~Y[1:0]~X[1:0]. The controller 141 sends a control signal via line 172 to register 134 causing register 134 to forward 702 the virtual address virtadd$_{tiled}$(X,Y) via line 177 to the memory unit 150. The control signal on line 172 also causes the memory unit 150 to access 703 a look-up table stored therein containing a conversion pattern between virtual addresses and frame buffer addresses. If in 704 the request is a write request, the controller 140 also sends a control signal via line 174 to the input/output buffer 120 causing the input/output buffer 120 to forward 705 the word of video data to register 130. The data accessing system 160b then performs steps 618 to 621 of FIG. 6.

The same conversion pattern can be stored in the memory unit 150 as was stored for the data accessing system 160a of FIG. 3 because the tiling pattern of the frame buffer 45 of data accessing system 160b is generated by the shifting of the bits of OFFSET, Y, and X in the sequence indicated by the concatenation "~" operator. Also, note that the serial shift operations of registers 130 and 131 were not used and need not be implemented in data accessing system 160b.

If the X and Y coordinates are treated as unsigned binary bit numbers, then the virtual address generated by the data accessing system 160b can be interpreted as being logically equivalent to OFFSET*$2^{27}$+Y[27:10]*$2^{11}$+X[9:2]*$2^4$+Y[1:0]*$2^2$+X[1:0]. However, conventional multiplication and addition hardware is not needed for generating the virtual address nor the frame buffer address, and the described forwarding and concatenation operations can be performed faster than the addition and multiplication operations of conventional display processors and CPU's, particularly because carry terms of the multiplication and addition have been eliminated. Consequently, the data accessing system 160b performs the logical equivalent of several multiplications and additions simultaneous with concatenating of the bits of the horizontal X and vertical Y coordinates of the pixel consistent with the tiling pattern.

The video controller 20 can read the frame buffer 45 by generating and sending to the address decoder 46 of the system memory 40 appropriate read requests for the system memory 40 and appropriate tiled addresses for the pixels in synchrony with the scanning of said pixels in the CRT monitor 30. The generation of such tiled addresses in the video controller 20 can be implemented in a conventional manner using multiplication and addition hardware. Alternatively, the hardware for generating virtual addresses and frame buffer addresses of the data accessing system 160b can be duplicated within the video controller 20 for increasing the performance speed of the video controller 20 if desired.

The video controller 20 can alternatively be modified to read the frame buffer 45 by sending a read request for the data accessing system 160b along with the (X,Y) coordinates for a pixel of the display surface 31 via the bus 50 to the data accessing system 160b. The data accessing system 160b generates the virtual address associated with the received (X,Y) coordinates, converts the virtual address into the associated frame buffer address, and then access the frame buffer 45 at the generated frame buffer address. The frame buffer 45 sends the associated word of video data for the pixel at (X,Y) via the bus 50 to the video controller 20 which converts the word into an appropriate analog format for controlling illumination of the pixel at (X,Y). The video controller 20 then sends the analog signal via the analog line 55 to the CRT monitor 30 for controlling illumination of the pixel at (X,Y). The modification of the video controller 20 used in this embodiment of the present invention may be minimal for typical video controllers that generate (X,Y) coordinates of pixels for controlling the position of the beam of electrons that scans the display surface 31 of the CRT monitor. Further, tiling patterns can generate a large number of gaps in the frame buffer addresses used for storing video data for the pixels of a single scan line, with the gaps typically addressing video data for other scan lines; however, the modified video controller 20 easily handles such gaps for many tiling patterns because it uses the tiling hardware of the data accessing system 160b that implements the tiling pattern to read the frame buffer 45 and also because it avoids time consuming and highly complicated arithmetic operations for generating frame buffer addresses. In contrast, because of such gaps, the conventional computer systems typically implement tiling using tiles that are 8 to 32 times as wide as they are high.

Some alternate embodiments of the present invention modify the video controller 20, frame buffer 45, and/or data accessing system 160b in other manners for improved performance. For example, the frame buffer 45 can be dual ported and one of the ports dedicated for the video controller 20 which accesses the dedicated port using an additional dedicated bus (not shown), to reduce demand and contention for the bus 50. Video controller functionality can be incorporated into the data accessing system 160b, for example, by including hardware that generates X and Y coordinates appropriately sequenced for scanning the scan lines of the display surface 31 and hardware for converting the (X,Y) coordinates and video data into an appropriate analog format for the CRT monitor 30. The data accessing system 160b can also be modified to provide linear addressing or other patterns of tiled addressing. Linear addressing can be implemented, for example, by modifying the controller 141 to send in lieu of 701 a control signal via line 172 to register 130 to forward the bits for the OFFSET, Y[17:0], and X[9:0] for parallel input into the bits R[31:28], R[27:10] and R[9:0] respectively of register 130 to form a virtual linear address virtadd(X,Y) given by virtadd(X,Y)=OFFSET~Y[17:0]~X[9:0].

Figure 5:
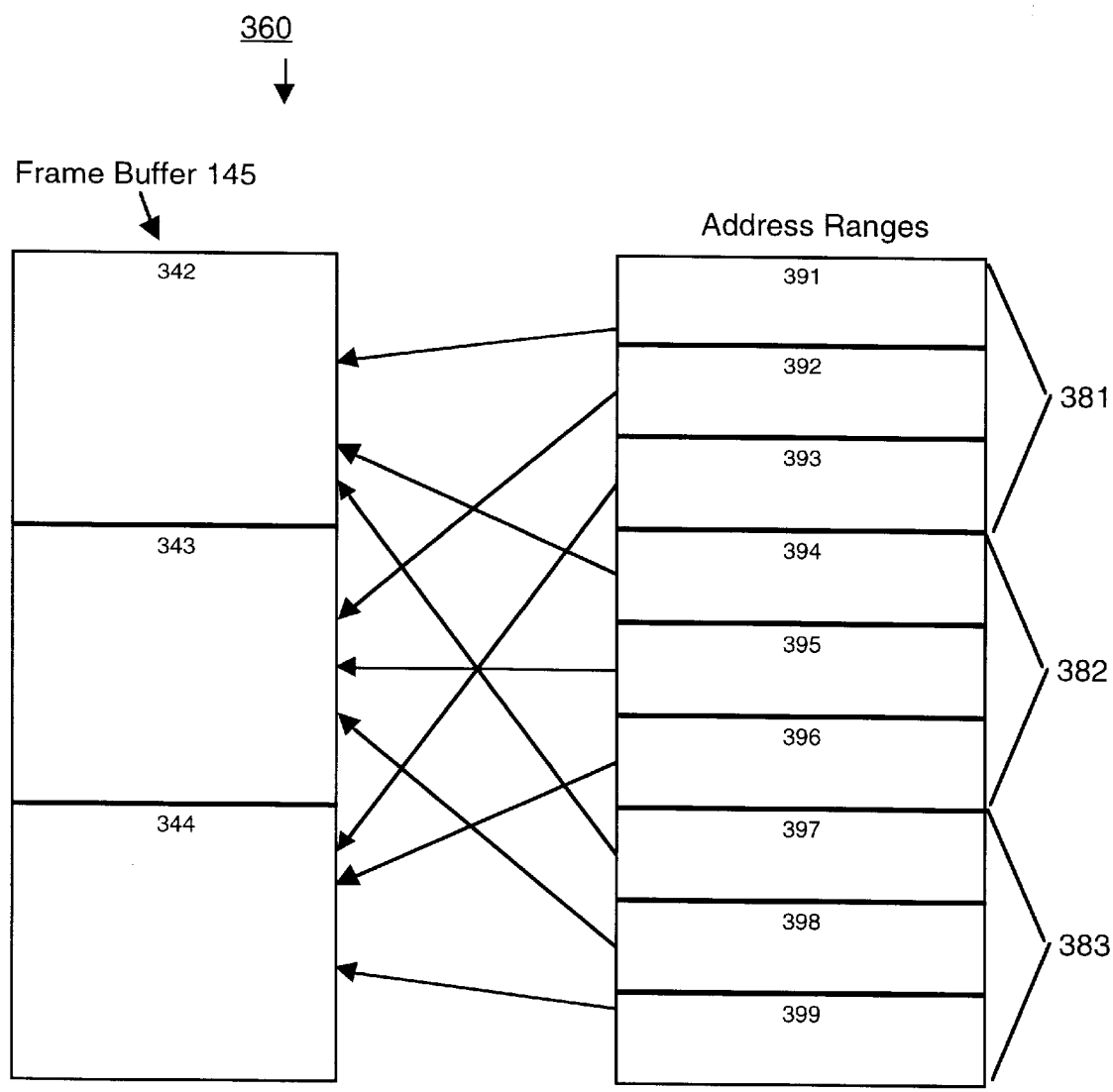
FIG. 5 is a block diagram of a data accessing system according to one embodiment of the present invention using a plurality of address ranges.

Referring now to FIG. 5, there is shown a block diagram of one embodiment of a data accessing system 360 of the present invention and using a plurality of address ranges for accessing a frame buffer 145 having three blocks of addressed memory cells 342, 343, 344 that are appropriately responsive to virtual addresses. This embodiment uses a virtual address range contained within an address space recognized by a central processing unit (CPU) and allows each of a plurality of memory cells of the frame buffer 145 to have a plurality of addresses in this address space. The first block 342 of the frame buffer 145 implements a virtual linear addressing of a display surface of a display panel (not shown) and the second and third blocks 343, 344 have virtual tiled storage patterns. A first set 381 of three address ranges 391, 392, 393 provides direct access to the frame buffer 145 which allows other components of a computer system such as a CPU or a video controller (not shown) to determine addresses for accessing the frame buffer 145. The first range 391 of this first set 381 accesses the virtual linear address portion of the frame buffer 145, and the second and third ranges 392, 393 access the virtual tiled portions of the frame buffer 145. Addresses determined for direct accessing should reflect the virtual addressing employed because the frame buffer 145 is appropriately responsive to virtual addresses. A second set 382 of three address ranges 394, 395, 396 and third set 383 of three address ranges 397, 398, 399 are used for providing virtual address access of the frame buffer 145 responsive to received (X,Y) coordinates of pixels on the display surface of the display panel, with the first range 394, 397 in both the second and third sets 382, 383 used for generating virtual linear addresses from received (X,Y) coordinates, and the second and third ranges 395, 396, 398, 399 in both the second and third sets 382, 383 used for generating virtual tiled addresses.

The first set 381 of three address ranges 391, 392, 393 allows virtual addresses determined by a CPU or other peripheral component (not shown) to be used for accessing the frame buffer 145. An alternate embodiment of the present invention incorporates an additional address range for intercepting conventional linear addresses and converting the intercepted addresses into appropriate virtual addresses for accessing the frame buffer 145. Such conversion of conventional linear address can be implemented, for example, using a look-up table that provides an appropriate conversion between the conventional linear addresses and the virtual linear or virtual tiled addresses of data accessing system 360. Conventional span processors implementing a tiled frame buffer often intercept and convert a conventional linear address add(X,Y) from, for example, a CPU into bit representations of the (X,Y) pixel coordinates of the associate pixel, with X generated by performing X=add(X,Y) modulo $Span_x$ in modulo hardware and Y generated by performing Y=add(X,Y)/$Span_x$ using division hardware. The requirement of dynamically performing division and module operations limits the performance speed of conventional display processors particularly because division and modulo are very time consuming and hardware intensive operations to fully implement. By using the look-up table, this alternate embodiment of the present invention avoids the need for such conventional division and modulo hardware.

The illustrated embodiment of a data accessing system supports direct access of the frame buffer in either linear or one or more tiled formats. It also supports access responsive to received bit representations of horizontal and vertical (X,Y) pixel coordinates to both the linear and tiled regions of the frame buffer. Further, linear addresses from the CPU are intercepted in a particular range of virtual addresses for appropriate conversion into virtual addresses. The determination of virtual addresses can be implemented using shift and replace operations or concatenation operations applied to bit representations for X and Y, with the appropriate operations depending on the particular tiling employed.

By providing a plurality of blocks of addressed memory cells within a frame buffer, the present invention can provide rapid windowing of pixmaps. An active block of memory cells can store a pixmap for controlling the current appearance of pixels on the display panel. An inactive block of memory cells can be updated by the CPU or a peripheral device. When the inactive block is ready for display, the inactive block can be made active and the active block inactive, for allowing the formerly active block to be updated. Switching between the blocks can be implemented in hardware by changing a virtual address range used for video controller read requests. For example, the two blocks can be selected to begin at addresses BLOCKOFFSET~00 . . . 00 where BLOCKOFFSET equals BLOCKOFFSET0 for one of the blocks and BLOCKOFFSET1 for the other of the blocks respectively, with the current BLOCKOFFSET value being stored in a 4-bit register. Generating X and Y bit representations in shift registers that linearly scan through the possible pixel coordinates of the monitor, the video controller can be made to read a new window by merely changing the BLOCKOFFSET. This beneficially helps to provide graphic images whose pixels appear to change simultaneously, thereby providing smoother transitions between graphic images. The described windowing functionality can be used both for switching between windows on the display surface and for switching between frames of a graphic images being displayed in the same window of the display surface.

A plurality of blocks of addressed memory cells can similarly be used for rapid canvassing of graphic images for display on a portion of the display surface, such as button bars, menus, and the like. In one embodiment of the present invention, this is achieved by changing a BLOCKOFFSET bit or bits appropriately in synchrony with the generation by shift registers of X or Y bit representations for providing video controller functionality. For example, to switch the top sixteen rows of the image displayed to a button bar, the BLOCKOFFSET is switched to the beginning location in the virtual address range of the button bar when Y returns to zero. When Y obtains the value sixteen, the OFFSET is switched back to the OFFSET value for the remainder of the graphic image presented. This allows canvasses such as button bars to be sent to the screen without the need of actually writing memory cells in the frame buffer, thereby increasing the speed of canvassing functionality.

In some embodiments of the present invention, the data stored in the frame buffer identifies directly the actual intensity and color of the pixels of the display panel. However, alternate embodiments of the present invention store indexes for each pixel in the frame buffer. Each index value is used for accessing a look-up table that stores identifies how that index value should be used for controlling pixels of the display panel. This allows the color or intensity of each pixel having the same index value to be changed rapidly without the need of rewriting memory cells in the frame buffer.

The present invention can be implemented for support of graphics standards. The present invention can provide addressing from X and Y bit representations, linear addressing from CPU software, and direct accessing of the frame buffer, thereby providing highly flexible usage. For allowing each virtual address range to be appropriately accessed, the values of appropriate offsets are provided for use by the CPU, peripheral devices, and software.

I claim:

1. A computer-implemented method for accessing representations of pixels for a display panel in a frame buffer, each pixel having a first coordinate and a second coordinate, the method comprising the steps of:
  a) determining a span of first coordinates of pixels of the display panel;
  b) defining a virtual frame buffer having a first dimension at least as large as the span of the first coordinates;
  c) generating a virtual address indicating a first coordinate and second coordinate of a pixel from the first dimension of the virtual frame buffer and the first and second coordinates of the pixel, with the virtual address identifying a memory cell; and
  d) performing one of a reading operation and a writing operation of a representation of the pixel in the memory cell identified by the virtual address.

2. The method of claim 1, further comprising:
  e) repeating b) through d) for each of a plurality of pixels having first coordinates in the determined span.

3. The method of claim 1, further comprising:
  e) defining a base value, and wherein the first dimension of the virtual frame buffer is a power of the base value.

4. The method of claim 3, wherein the first and second coordinates of the pixel are stored as bit representations and the base value is defined as a power of two.

5. The method of claim 1, wherein the first and second coordinates of the pixel are stored as bit representations and c) comprises concatenating the bit representation of the first coordinate of the pixel to the bit representation of the second coordinate of the pixel.

6. The method of claim 1, wherein d) comprises converting the generated virtual address into a memory address in a memory address range of the frame buffer and performing one of a reading operation and a writing operation of a representation of the pixel in a memory cell identified by the memory address.

7. The method of claim 1, wherein d) comprises performing one of a reading operation and a writing operation of a representation of the pixel in a memory cell identified by the virtual address in a frame buffer addressed by the addresses of the virtual frame buffer.

8. The method of claim 7, wherein the frame buffer is addressed by the addresses of the virtual frame buffer that represent virtual addresses of pixels of the display panel.

9. A computer-implemented method for accessing representations of pixels of a display panel in a frame buffer, the display panel having a plurality of pixels each pixel having a first coordinate and a second coordinate, the method comprising the steps of:
  a) determining a span of first coordinates of pixels of the display panel;
  b) selecting a second tile span representing a length of a tile of the display panel along the second coordinates of pixels of the display panel;
  c) defining a virtual frame buffer having a first dimension at least as large as the span of the first coordinates times the second tile span;
  d) generating a virtual address indicating a first coordinate and a second coordinate for a pixel from the first dimension of the virtual frame buffer and the first and second coordinates of the pixel; and
  e) performing one of a reading operation and a writing operation of a representation of the pixel in a memory cell of the frame buffer identified by the virtual address.

10. The method of claim 9, further comprising:
  f) repeating c) through e) for each of a plurality of pixels of the display panel.

11. The method of claim 9, further comprising:
  f) defining a base value, and wherein the first dimension of the virtual frame buffer is a power of the base value.

12. The method of claim 11, wherein the first and second coordinates of the pixel are stored as bit representations and the base value is defined as a power of two.

13. The method of claim 9, wherein d) comprises converting the generated virtual address into a frame buffer address in a frame buffer address range of the frame buffer and performing one of a reading operation and a writing operation of a representation of the pixel in a memory cell of the frame buffer identified by the frame buffer address.

14. The method of claim 9, wherein d) comprises performing one of a reading operation and a writing operation of a representation of the pixel in a memory cell identified by the virtual address in a frame buffer addressed by virtual addresses.

15. The method of claim 14, wherein the frame buffer is addressed by the addresses of the virtual frame buffer that represent virtual addresses of pixels of the display panel.

16. A computer-implemented method for accessing representations of pixels of a display panel in a frame buffer, the display panel having a plurality of pixels each pixel having a first coordinate and a second coordinate, the method comprising the steps of:
  a) determining a span of first coordinates of pixels of the display panel;
  b) selecting a second tile span representing a length of a tile of the display panel along the second coordinates of pixels of the display panel;
  c) defining a virtual frame buffer having a first dimension at least as large as the span of the first coordinates times the second tile span;

d) generating a virtual address indicating a first coordinate and a second coordinate for a pixel from the first dimension of the virtual frame buffer and the first and second coordinates of the pixel; and e) performing one of a reading operation and a writing operation of a representation of the pixel in a memory cell of the frame buffer identified by the virtual address;

wherein the first and second coordinates of the pixel are stored as bit representations and d) comprises:

f) removing a quantity of bits from the bit representation of the second coordinate of the pixel equal in number to the length of the second tile span and concatenating the quantity bits with the bits of the bit representation of the first coordinate of the pixel; and g) concatenating with the result of f) bits of the bit representation of the second coordinate of the pixel less the quantity of bits.

* * * * *